UNITED STATES PATENT OFFICE 2,639,394

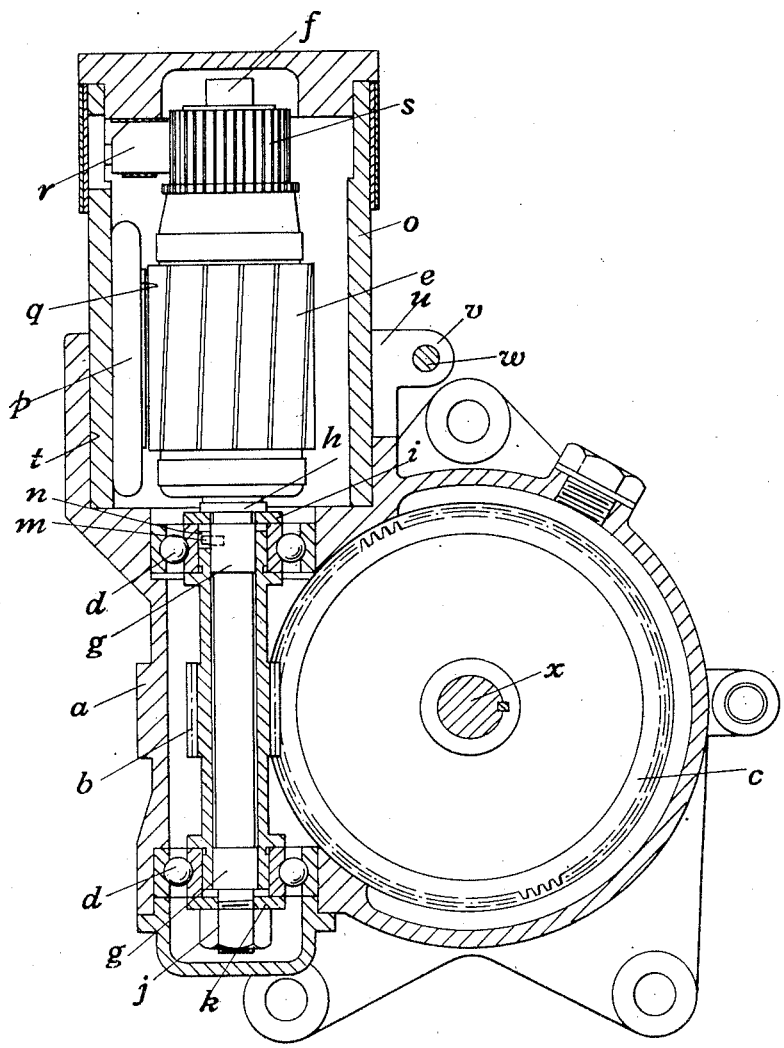

ELECTRIC MOTOR-DRIVEN WORM GEARING

Cecil James Douglas, Ruislip, England, assignor to C. A. V. Limited, London, England Application July 30, 1951, Serial No. 239,353
In Great Britain August 23, 1950

3 Claims. (Cl. 310—83)

This invention relates to worm gearing of the kind in which the worm is directly connected to an electric driving motor.

The object of the invention is to enable the motor and gearing to be combined in a compact and convenient form.

The invention comprises the combination of a hollow worm which is supported at its ends by bearings in a housing, a motor armature from one end of which extends a spindle adapted to be inserted in and secured to the worm, so that the worm bearings serve also as the armature bearings, and a cylindrical motor stator which is supported by a hollow cylindrical part of the housing.

The accompanying drawing illustrates one manner of carrying the invention into effect.

Referring to the drawing, there is provided a housing $a$ of any convenient construction for containing the worm $b$ and worm wheel $c$. The worm is made hollow; that is to say, it is formed with an axial bore extending throughout its length. Also the worm is supported at its ends in the housing by ball or roller bearings $d$ situated at the end of the worm.

The armature of the motor $e$ is provided with a spindle $f$ which extends from one end of the armature. The spindle is such that it can be inserted through the worm and is provided with lands $g$ which fit the ends of the worm bore. On the portion of the spindle immediately adjacent to one end of the armature is formed a collar $h$, and in contact with one face of this collar is placed a washer $i$ which abuts against one side of the inner race of the adjacent bearing. The opposite end of the spindle is screw threaded, and on this end is provided a securing nut $j$ acting on a loose collar $k$ in contact with one side of the inner race of the other bearing. Relative rotation of the worm and spindle is prevented by splines, or by a key $m$ on one part engaging a slot $n$ in the other part, or in any other convenient manner. The arrangement is such that the armature is supported by the same bearings as the worm, and the armature is carried by the overhanging part of the spindle which extends through the armature.

The motor stator comprises a hollow cylindrical body part $o$ in which are mounted the field windings (as $p$) and pole pieces (as $q$), and also the brushes $r$ which co-operate with the commutator $s$ on the armature. To support the stator, the housing $a$ of the worm gearing is formed with a cylindrical socket $t$ into which one end of the stator can be inserted. The stator is secured to the socket in any convenient manner. Preferably there is formed in the socket a slot $u$ which is flanked by a pair of lugs $v$ through which a screw $w$ is inserted, tightening of the screw causing the socket to grip the inserted end of the stator.

By this invention a combined worm gearing and motor can be constructed in a very simple manner. The invention is intended more particularly for use on vehicle or other door actuating mechanisms, but it may be applied to other uses. When applied to a door actuating mechanism, one end of the worm wheel spindle $x$ extends through the housing and is connected to a part which actuates the door mechanism, through a spring-loaded multiplate or other like clutch (not shown).

Having thus described my invention what I claim as new and desire to secure by Letters Patent is:

1. An electric motor driven worm gearing comprising, a housing, a worm integral with a hollow cylindrical structure extending axially on both sides of said worm, spaced bearings in the housing rotatably supporting the two ends of said hollow cylindrical structure, an overhung motor armature having a spindle extending from one end thereof adapted to be removably inserted into and supported by said hollow structure, means for detachably securing said spindle against axial movement in said hollow structure, slidable keying means forming a driving connection between said spindle and said hollow structure and enabling axial withdrawal of the spindle therefrom, a hollow cylindrical housing part coaxial with the aforesaid spaced bearings, and a cylindrical motor stator removably supported in said cylindrical housing part whereby the motor stator and armature may be readily withdrawn axially without disturbing the worm structure in its bearings.

2. An electric motor driven worm gearing according to claim 1, in which the armature spindle is formed with spaced lands which fit closely within the hollow cylindrical worm structure near the ends thereof.

3. An electric motor driven worm gearing according to claim 1, in which the armature spindle has a collar which bears through a washer on one end of the hollow cylindrical worm structure and the other end of said spindle is threaded to receive a nut which bears on the opposite end of said structure.

CECIL JAMES DOUGLAS.

References Cited in the file of this patent

UNITED STATES PATENTS

| Number | Name | Date |
|---|---|---|
| 1,245,574 | Dean | Nov. 6, 1917 |
| 1,303,011 | Aurand | May 6, 1919 |
| 1,580,682 | Sandell | Apr. 13, 1926 |
| 1,914,390 | Whaley | June 20, 1933 |

FOREIGN PATENTS

| Number | Country | Date |
|---|---|---|
| 489,744 | Germany | Jan. 20, 1930 |